United States Patent
Oh et al.

(10) Patent No.: US 8,009,388 B2
(45) Date of Patent: Aug. 30, 2011

(54) METHOD FOR INCREASING STORAGE CAPACITY AND A TRANSDUCER CONFIGURATION INCORPORATING THE SAME

(75) Inventors: Chee Fong Oh, Singapore (SG); Swee Chuan Gan, Singapore (SG); Lihong Zhang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 490 days.

(21) Appl. No.: 11/548,077

(22) Filed: Oct. 10, 2006

(65) Prior Publication Data

US 2008/0084636 A1    Apr. 10, 2008

(51) Int. Cl.
  *G11B 5/39*    (2006.01)
  *G11B 5/60*    (2006.01)

(52) U.S. Cl. ............... 360/234.7; 360/234.8; 360/236.5; 360/317; 360/76; 360/137

(58) Field of Classification Search ............... 360/234.7, 360/294.1, 294.4, 234.8, 234.9, 236.5, 317 360/76, 137
See application file for complete search history.

(56) References Cited

U.S. PATENT DOCUMENTS

| | | | |
|---|---|---|---|
| 4,755,892 A | | 7/1988 | Carteau et al. |
| 4,800,455 A | * | 1/1989 | Takizawa .................. 360/234.7 |
| 4,945,427 A | * | 7/1990 | Cunningham ................... 360/75 |
| 5,682,274 A | * | 10/1997 | Brown et al. ............... 360/77.04 |
| 5,724,212 A | * | 3/1998 | Mallary et al. .............. 360/264.1 |
| 5,801,908 A | * | 9/1998 | Akiyama et al. ........... 360/294.4 |
| 5,943,189 A | * | 8/1999 | Boutaghou et al. ......... 360/234.7 |
| 6,021,024 A | | 2/2000 | Akiyama et al. |
| 6,201,666 B1 | | 3/2001 | Resh |
| 6,594,219 B1 | | 7/2003 | Yamamoto et al. |
| 6,927,946 B2 | * | 8/2005 | Shum et al. ................. 360/294.3 |
| 6,987,637 B2 | * | 1/2006 | Litvinov et al. .................. 360/76 |
| 7,002,777 B2 | * | 2/2006 | Ogawa et al. ............ 360/125.46 |
| 7,072,147 B2 | * | 7/2006 | Limmer et al. ............ 360/264.1 |
| 2001/0017751 A1 | * | 8/2001 | Miyazaki et al. .............. 360/317 |
| 2005/0122630 A1 | * | 6/2005 | Hipwell et al. ............. 360/294.5 |
| 2005/0128642 A1 | * | 6/2005 | Weiss et al. ................ 360/234.6 |
| 2007/0165331 A1 | * | 7/2007 | Liu et al. .................... 360/234.7 |

* cited by examiner

*Primary Examiner* — Jefferson Evans

(74) *Attorney, Agent, or Firm* — Campbell Nelson Whipps LLC

(57) ABSTRACT

The present invention provides a method for increasing storage capacity of a disc drive by physically skewing a transducer in relation to a slider supporting the transducer. The physical skew angle of the transducer is configured to provide a predetermined zero skew position on the medium, which is capable of providing an increased storage capacity to the medium. To ascertain this zero skew position, a storage density or storage capacity of the medium may be ascertained for each of various zero skew positions on the medium. A desired storage density or capacity level is selected according to storage capacity requirements and the corresponding zero skew position is ascertained. The corresponding zero skew position may be implemented by physically skewing a transducer relative to a slider.

5 Claims, 6 Drawing Sheets

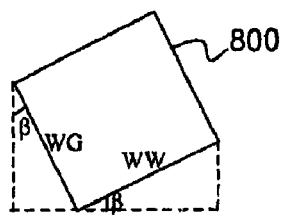 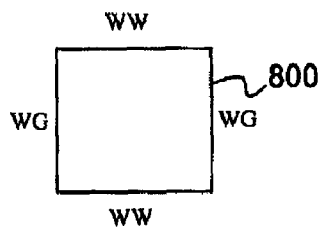 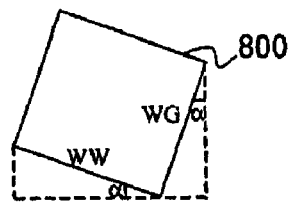
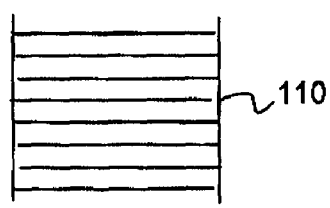 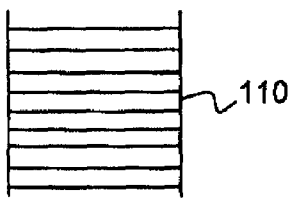 
FIG. 2A    FIG. 2B    FIG. 2C
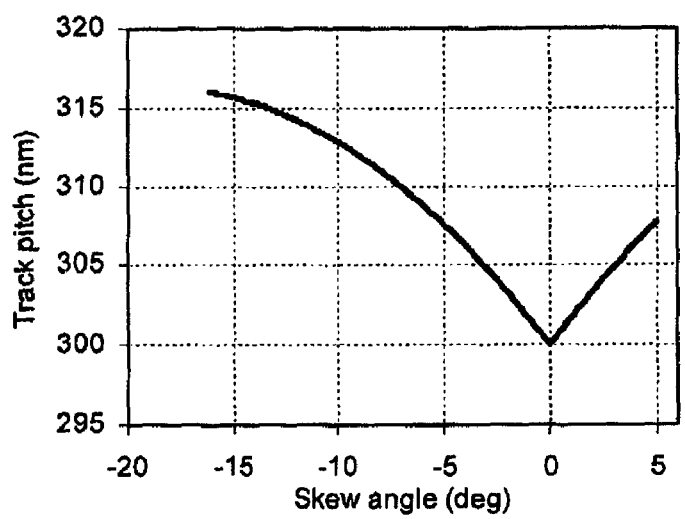
FIG. 3

| Design with Conventional Transducer | | | Design with a Skewed Transducer according to the Present Invention | | | | |
|---|---|---|---|---|---|---|---|
| Zone | No. of Data Sectors | No. of Tracks | Recording Capacity | Zone | No. of Data Sectors | No. of Tracks | Recording Capacity | Delta Changes |
| 0 | 129 | 138 | 17802000 | 0 | 129 | 138 | 17802000 | 0 |
| 1 | 84 | 184 | 15456000 | 1 | 84 | 184 | 15456000 | 0 |
| 2 | 232 | 1190 | 276080000 | 2 | 232 | 1286 | 298352000 | 2.E+07 |
| 3 | 224 | 779 | 174496000 | 3 | 224 | 1475 | 330400000 | 2.E+08 |
| 4 | 218 | 1286 | 280348000 | 4 | 218 | 1342 | 292556000 | 1.E+07 |
| 5 | 210 | 1475 | 309750000 | 5 | 210 | 3227 | 677670000 | 4.E+08 |
| 6 | 201 | 1342 | 269742000 | 6 | 201 | 1458 | 293058000 | 2.E+07 |
| 7 | 184 | 3227 | 593768000 | 7 | 184 | 2325 | 427800000 | -2.E+08 |
| 8 | 168 | 1458 | 244944000 | 8 | 168 | 1051 | 176568000 | -7.E+07 |
| 9 | 160 | 2325 | 372000000 | 9 | 160 | 1345 | 215200000 | -2.E+08 |
| 10 | 154 | 1051 | 161854000 | 10 | 154 | 1255 | 193270000 | 3.E+07 |
| 11 | 147 | 1345 | 197715000 | 11 | 147 | 1330 | 195510000 | -2.E+06 |
| 12 | 137 | 1255 | 171935000 | 12 | 137 | 1220 | 167140000 | -5.E+06 |
| 13 | 134 | 1330 | 178220000 | 13 | 134 | 1404 | 188136000 | 1.E+07 |
| 14 | 122 | 1220 | 148840000 | 14 | 122 | 1380 | 168360000 | 2.E+07 |
| 15 | 108 | 1404 | 151632000 | 15 | 108 | 1350 | 145800000 | -6.E+06 |
| 16 | 213 | 899 | 191487000 | 16 | 213 | 899 | 191487000 | 0 |
| Total Capacity x 2 surfaces | | | 7.51E+09 | Total Capacity x 2 surfaces | | | 7.99E+09 | 6% |

METHOD FOR INCREASING STORAGE CAPACITY AND A TRANSDUCER CONFIGURATION INCORPORATING THE SAME

FIELD OF INVENTION

The present invention relates generally to data storage systems, and more particularly to overcoming constraints resulting from skew angle phenomena using an improved transducer configuration.

BACKGROUND OF THE INVENTION

Over the past decades, data storage systems have experienced tremendous improvements in areal storage density. This development enabled data storage systems to continually miniaturize and yet provide increased storage capacity. As market demand for smaller form factors persists, data storage manufacturers are continually in search of new technologies to increase storage capacity. In data storage systems where disc-shaped magnetic media are used (e.g. a disc drive), significant advancements have been made to transducer and slider technologies to increase areal density. Such technologies, however, are approaching physical limit.

A further limitation to increasing areal density is the conventional methods of reading and writing operations in a disc drive. A disc-shaped medium is configured to store data in a series of concentric, closely spaced data tracks, each of which is divided into sectors. The medium is generally rotated while a transducer is moved over the medium surface to read or write data. Where a rotary actuator is used to move the transducer, the arcuate path taken by an actuator arm introduces a skew angle between the transducer and the data track due to different axes of rotation between the actuator path and the medium. The skew angle changes according to the radial location of the transducer on the medium. At certain positions on the medium where the skew angle becomes too large, the transducer may read or write an adjacent track. To prevent such occurrences, track pitches at regions near the outer and inner edges have to be increased. Consequently, track density (number of tracks per radial length) and areal density are reduced.

In view of the foregoing, it is desirable to provide a method for increasing storage capacity to overcome the constraints resulting from skew angle phenomena.

SUMMARY OF THE INVENTION

The present invention relates to a method for increasing storage capacity and a transducer configuration incorporating the method to overcome the skew angle phenomena. According to the present invention, the transducer is physically skewed at an appropriate angular displacement relative to a slider supporting the transducer. This angular displacement ensures a zero skew position at a predetermined location on a medium, for providing an increased storage capacity as compared to a conventional non-skewed transducer. To obtain this zero skew position, calculations may be required to ascertain the respective storage density or storage capacity of each possible zero skew position on the medium. The zero skew position that is capable of meeting certain storage requirements may be selected therefrom.

These and other various features as well as advantages which characterize the present invention will be apparent upon reading of the following detailed description and review of the associated drawings.

BRIEF DESCRIPTION OF THE DRAWINGS

FIG. 2A illustrates a transducer in a negative skew angle position.

FIG. 2B illustrates a transducer in a zero skew angle position.

FIG. 2C illustrates a transducer in a positive skew angle position.

FIG. 3 illustrates the variation of track pitch in relation to skew angle for a one-inch disc drive.

DETAILED DESCRIPTION

In the following description, numerous specific details are set forth in order to provide a thorough understanding of various embodiments of the present invention. It will be understood, however, to one skilled in the art, that embodiments of the present invention may be practiced without some or all of these specific details. In other instances, well known process operations have not been described in detail in order not to unnecessarily obscure pertinent aspects of embodiments being described.

Figure 1:
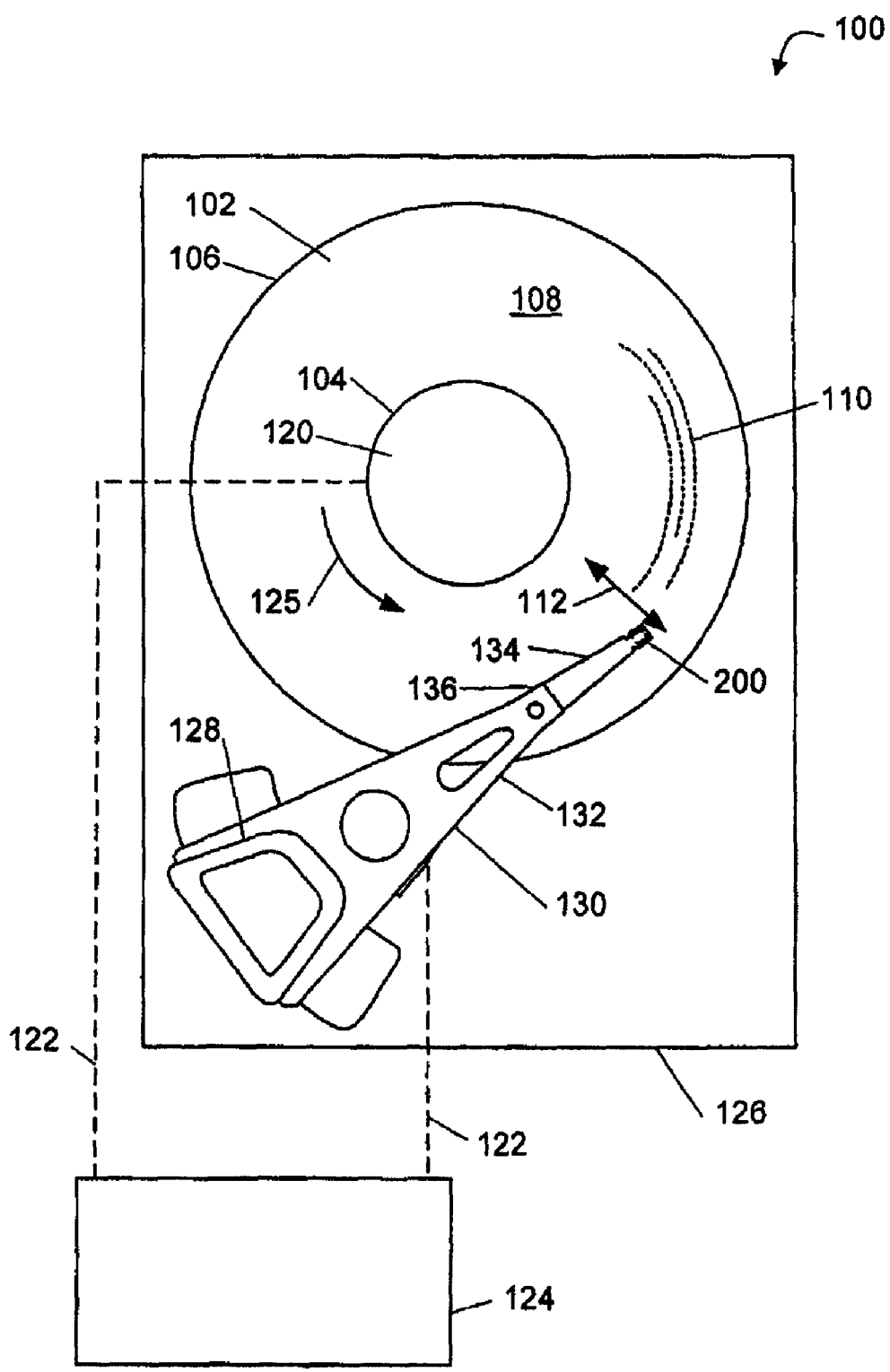
FIG. 1 is a schematic drawing of a data storage device having a disc-shaped medium.

Reference is made to a disc drive 100, such as one schematically presented in FIG. 1. A medium 102 in this example is substantially flat and annular, with an inner edge 104 and an outer edge 106 bounding at least one surface 108 which can be formatted for storing data. Data can generally be stored in one or more tracks 110. Depending on the mechanism used, the tracks 110 may be a continuous spiral or a plurality of generally concentric circles. In any case, the curvature of the track 110 changes as one moves in a radial direction 112 across the medium 102. For example, as one moves from the inner edge (ID) 104 to the outer edge (OD) 106, one encounters decreasing track curvature, and vice versa. In the following description, an inner edge 104 refers to an innermost data track available for read-write operations. Similarly, an outer edge 106 refers to an outermost data track available for read-write operations.

The medium 102 is mounted to a first motor 120, operably coupled 122 to circuitry 124 so that it can be rotated 125 at desired speeds during operation. Also secured to the disc drive housing 126 is a second motor 128, operably coupled 122 to circuitry 124, for controllably driving an actuator 130. The actuator 130 may include an arm 132 and a suspension assembly 134 supported at a distal end 136 of the arm 132. The suspension assembly 134 may include a flexibly supported slider 200, which in turn carries one or more transducers (not shown in FIG. 1) for recording data to the medium 102 or for retrieving data from the medium 102. In this manner, transducers can be supported and moved to different tracks 110, that is, to different radial locations on the medium 102.

FIGS. 2A, 2B and 2C illustrate the arrangements of a transducer at certain radial locations on a medium 102 and its corresponding track pitch. As mentioned earlier, a skew angle is introduced between a transducer and a data track 110 due to different axes of rotation between an actuator path and the medium 102. The skew angle changes from a negative value to a positive value as the transducer moves from an inner edge 104 to an outer edge 106 of the medium 102. For any medium, there is a certain radial location between the inner 104 and outer edge 106 where the skew angle is 0 degree (°). This zero skew position varies according to the form factor of the medium 102, type of slider and transducer size. At the zero skew position (FIG. 2B), track pitch (TP) may approximately equal the writer width (WW). At a negative skew position (FIG. 2A), the transducer forms a skew angle $\beta$ with the track tangent, where the skew angle and track pitch have a relationship represented by a formula TP≈WG sin ($\beta$)+WW cos ($\beta$), where WG is the writer or magnetic gap and WW is the writer width. At a positive skew position (FIG. 2C), the transducer forms a skew angle $\alpha$ with the track tangent, where the skew angle and track pitch have a relationship represented by a formula TP≈WG sin ($\alpha$)+WW cos ($\alpha$). It should be appreciated from FIGS. 2A, 2B and 2C that the track pitch at zero skew position is smaller than at both positive and negative skew positions.

The effect of zero skew position on areal density will be apparent from the following description relating to a one-inch disc drive in which a transducer has a writer gap of 100 nanometers (nm) by 300 nm. Reference is now made to FIG. 3, which illustrates the variation of track pitch as skew angle changes across the radius of a medium 102. For illustration purposes only, skew angle at the outer edge 106 of a medium 102 is arbitrarily configured at 5°. As the transducer moves inwards from the outer edge 106, the skew angle changes from 5° to 0°, and track pitch concurrently decreases from about 308 nm to about 300 nm. As the transducer moves further inwards, skew angle changes from 0° to about −17° at the inner edge, and track pitch increases at a polynomial rate to about 316 nm. With the increased track pitch required at both positive and negative skew positions, average data track density of the medium 102 is reduced.

Figure 4:
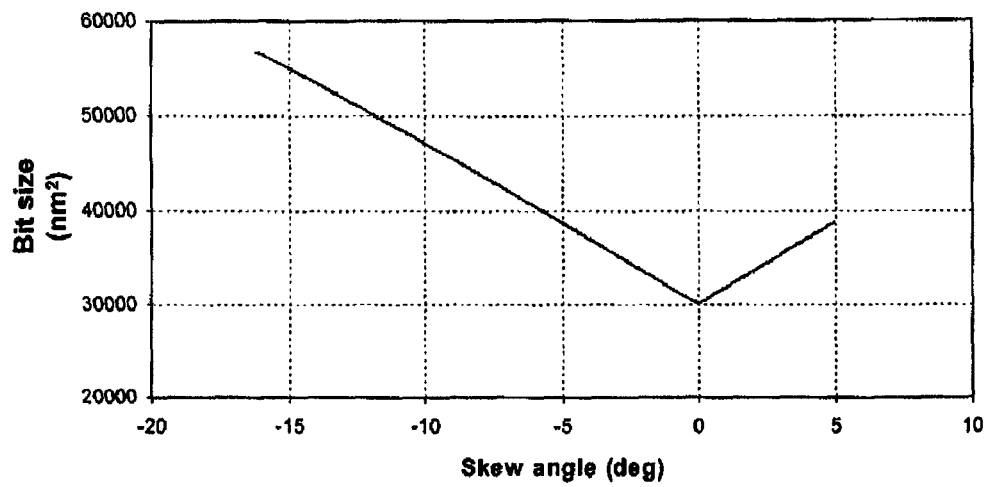
FIG. 4 illustrates the variation of bit size in relation to skew angle for a one-inch disc drive.

Reference is now made to FIG. 4 illustrating the variation of bit size as skew angle changes across the radius of a medium 102. As the skew angle increases both positively and negatively towards the outer edge 106 and inner edge 104 respectively, a larger track area is required to accommodate the transducer without overwriting to adjacent tracks. With the increased bit size required at the positive and negative skew positions, average linear density of the medium 102 is reduced.

It follows that average areal density is reduced since areal density (data bits per unit area) is the product of data track density (KTPI) (kilo-tracks per inch, or number of tracks per radial length) and linear density (KBPI) (kilo-bits per inch, or data bits per circumferential length). On the contrary, the present invention provides an important technical benefit by providing a method of increasing average areal density of a medium, and in turn increasing the total storage capacity of the medium, without the need for additional components or costly modifications to existing manufacturing equipment.

Figure 5A:
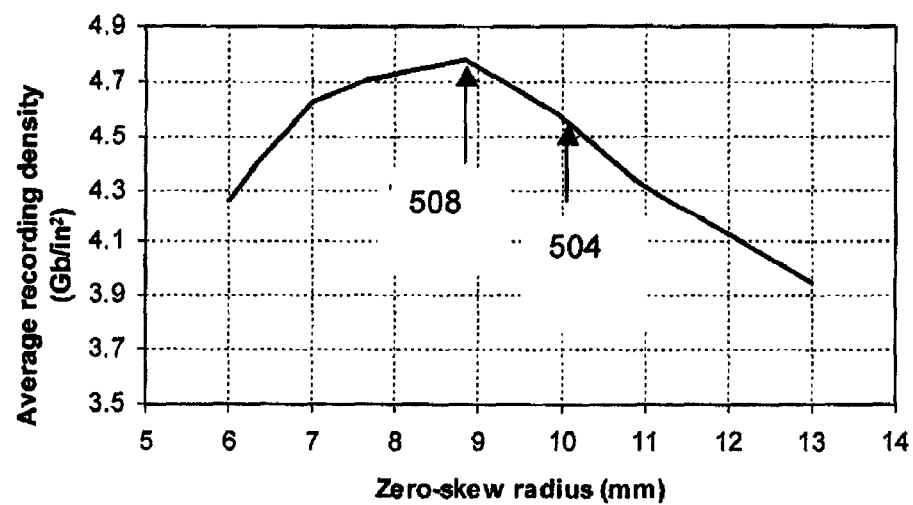
FIG. 5A illustrates the variation of average recording density in relation to zero skew position for a one-inch disc drive.

According to one embodiment of the present invention, areal density of a medium may be increased by optimizing the zero skew position on a medium 102. To this end, average recording or areal density is ascertained for a plurality of zero skew positions across a radial length of a one-inch disc drive. The data obtained therefrom may be presented as FIG. 5A. Referring to FIG. 5A, a conventional non-skewed transducer provides a zero skew position at about 10 mm from the outer edge 106 of the medium 102 and a corresponding average recording density of about 4.5 Gigabytes per square inch (Gb/square inch). It is apparent from FIG. 5A that several zero skew positions at certain other radial lengths are capable of providing even higher average recording densities. For example, a zero skew position at about 9 mm. 508 from the outer edge 106 of the medium 102 is capable of providing a highest average recording density of almost 4.8 Gb/square inch. It follows that if the zero skew position of a disc drive is appropriately configured at about 9 mm 508 instead, areal density of the medium 102 may be maximized.

With the reconfiguration of the zero skew position, the one-inch disc drive of the present example may experience a total capacity gain of about 6%. The capacity gain provided by the present invention is apparent from FIG. 6 in which total capacity of a medium 102 has been ascertained using the following equation:

$$\text{Total capacity} = \Sigma \text{ No. of data sectors} \times \Sigma \text{ No. of tracks} \times 2 \times \text{KBPS}$$

where the medium 102 has two surfaces and KPBS refers to kilo-bits per sector.

Figures 5B, 6:
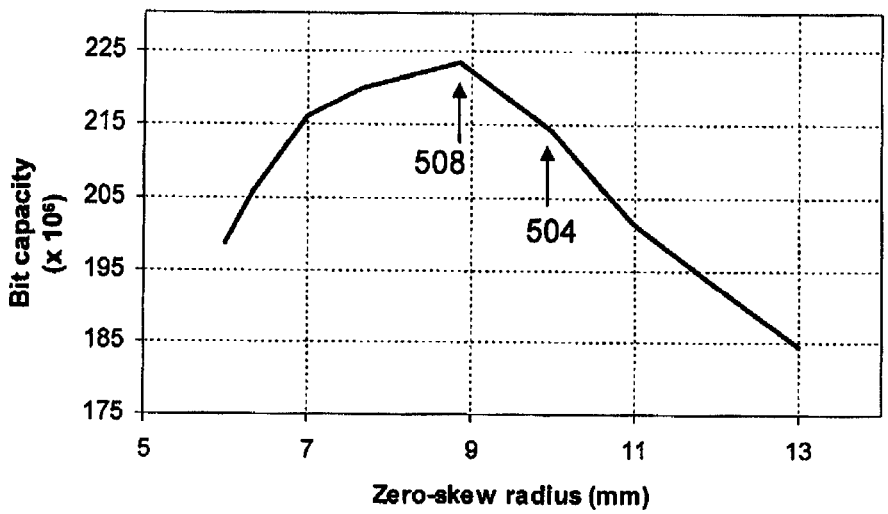
FIG. 5B illustrates the variation of bit capacity in relation to zero skew position for a one-inch disc drive.
FIG. 6 shows a comparison of storage capacities for a one-inch disc drive using a conventional non-skewed transducer and a same disc drive using a physically skewed transducer according to one embodiment of the present invention.

FIG. 6 sets out the storage capacities of various data zones in the one-inch disc drive having a conventional transducer and storage capacities of the data zones in the same disc drive having a physically skewed transducer of the present invention. With the present invention, data tracks 110 nearer the outer edge 106 (e.g. zones 2 to 6) experience increased storage capacities due to increased track density near the outer edge 106. Although certain other regions within zones 7 to 15 experience a loss in storage capacities, the cumulative effect is a net gain in total storage capacity of about 6%. The net gain is due to an increased track density of data tracks 110 nearer the outer edge 106 as well as an increased linear density which is proportional to radial length.

Figure 7:
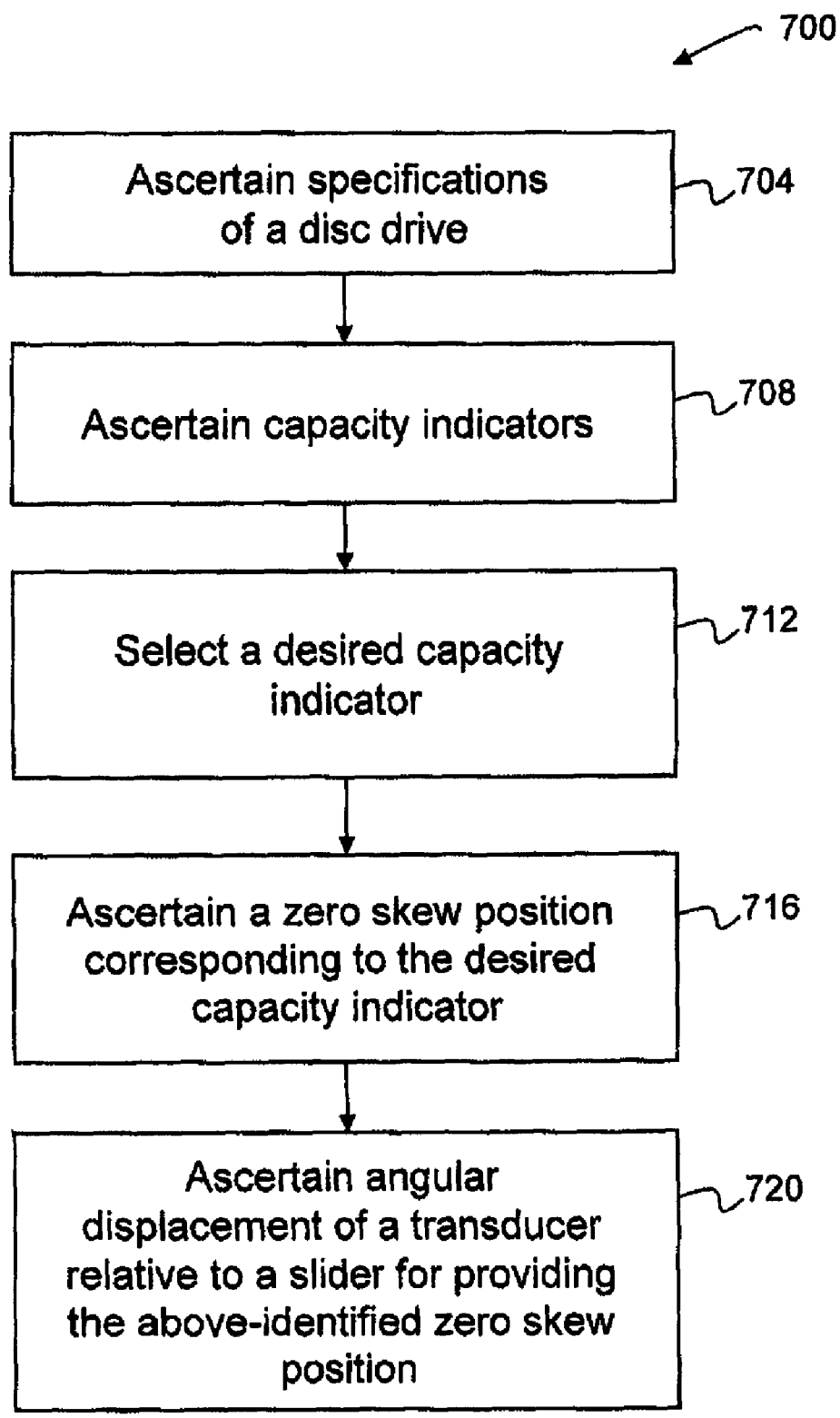
FIG. 7 is a flow chart illustrating a method according to one embodiment of the present invention.

Reference is now made to a flow sequence 700 of FIG. 7 illustrating the method of the present invention as applied to a disc drive of any form factor. Various specifications of a disc drive may be ascertained 704, for example, transducer dimensions, transducer shape, physical mechanics of transducer, transducer-to-disc spacing, slider arm dimensions, medium dimensions, inner recording radius of the medium, outer recording radius of the medium and recording density (e.g. in tracks per inch or bits per inch) of the disc drive having a non-skewed transducer. With these specifications, a plurality of capacity indicators are ascertained for the disc. A desired capacity indicator level is then selected 712 to meet certain storage capacity requirements. For example, if it is required to maximize storage capacity, the capacity indicator level 508 capable of providing maximum storage capacity is selected and its corresponding zero skew position is ascertained 716. To ensure that the transducer 800 consistently forms a zero skew at this radial location to provide the selected capacity indicator, the transducer 800 is physically skewed at an appropriate angle in relation to the slider 200. In the present one-inch disc drive, the physical skew angle is ascertained 720 as approximately 8.59° relative to the slider 200, and preferably to the trailing edge 212 of the slider 200. The physical skew angle value is the natural skew angle of a conventional transducer at this radial location if the transducer were not physically skewed.

Certain variations to the above may be practiced according to other embodiments of the present invention. While the above describes selecting a maximum capacity indicator value for implementing in the present invention, other capacity indicator values may alternatively be selected according to storage requirements. The above-mentioned capacity indicators are expressed in average recording density or areal density (bits per unit area), but may be expressed as other storage density forms, such as physical density (bits per unit volume), or as storage capacity of the medium, such as bit capacity.

FIG. 5B illustrates the variation of bit capacity of the same one-inch disc drive in relation to zero skew position. Consistent with FIG. 5A, a maximized storage capacity is provided at 508 where the zero skew position is at about 9 mm from the outer edge 106 whereas a reduced storage capacity is provided at 504 by a conventional non-skewed transducer having a zero skew position at about 10 mm.

Figure 8:
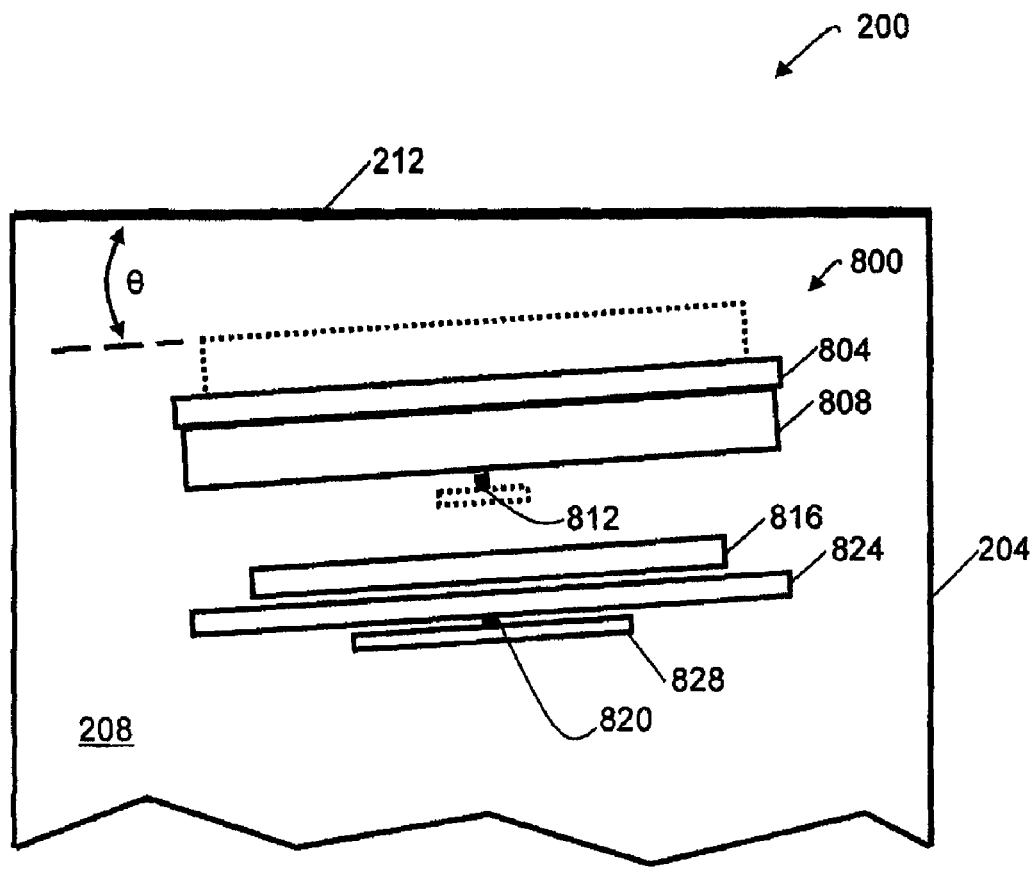
FIG. 8 illustrates a physically skewed transducer on a slider according to one embodiment of the present invention.

FIG. 8 illustrates a partial schematic view of a transducer 800 on a slider 200. The slider 200 includes a body 204 with a surface 208 (referred to generally as the air bearing surface) that opposes the medium 102 when in use. When the disc drive 100 is in operation, the medium 102 and the slider 200 will be in relative motion to each other. For example, the second motor 128 may hold the actuator 130 somewhat stationary while the first motor 120 keeps the medium 102 in rotation. At such a time, a point on the track 110 will first see the leading edge (not shown) of the slider 200 followed by the air bearing surface 208, and finally the trailing edge 212 of the slider 200.

The transducer 800 is affixed to the slider 200 and provided with a writer portion and a reader portion. The writer portion is located proximate to the trailing edge 212. The writer portion may include a contact pole 804 for measuring head-disc clearance based on servo position errors, and a bottom return pole 808 juxtaposed with the contact pole 804 for gathering magnetic flux emitted from the writing element 812 (for perpendicular magnetic recording). The reader portion is located remote from the trailing edge 212 and may include a top return pole 816 for gathering magnetic flux emitted from the writing element 812. A reading element 820 is interposed between a bottom shield 824 and a top shield 828, which are used to protect stray magnetic flux from interfering with the reader signals. It should be appreciated that other types of transducer, such as for longitudinal magnetic recording, are equally suitable in the present invention.

According to one embodiment of the present invention, the transducer 800 of the present invention is arranged at an angular displacement (e) in relation to the slider 200. More particularly, the angular displacement is relative to the trailing edge 212 of the slider 200. For the foregoing one-inch disc drive, the angular displacement is ascertained at about 8.59° relative to the slider 202. This angular displacement provides the medium 102 with the predetermined zero skew position capable of providing the medium 102 with the selected storage capability.

Embodiments of the present invention may be implemented in disc drives of various form factors to achieve larger capacities. In the present description, the form factor of a disc drive generally refers to the physical dimensions and shape of the disc drive. The present invention can be particularly useful for form factors smaller than two-and-a-half inches, as such disc drives may not be able to achieve the desired storage capacities through changing the relative dimensions of internal disc drive components. For example, in some cases, a 1.8-inch disc drive may have an optimum zero skew radius or position at 14.8 mm from the inner edge. Due to constraints of the dimensions of internal disc drive components, it may not be possible to implement this optimum zero skew position. Instead, an alternative zero skew position may be implemented by shifting the zero skew position 5.6 degrees towards the outer edge of the medium therefore resulting in a reduced storage capacity. According to an embodiment of the present invention, the zero skew position can be repositioned at the optimum zero skew position (i.e. shifting the zero skew position 5.6° towards the inner edge of the medium) by physically skewing a transducer at 5.6° relative to a slider supporting the transducer. This way, storage capacity is increased by 4.5% without the need to undergo any costly re-design of the mechanical aspects of the disc drive. Capacity gain may differ for other form factors and transducer type, or for disc drives of the same form factor but different mechanical designs.

The present invention is thus particularly advantageous as it provides a low cost solution to increasing storage capacity. Additional tooling and processing to implement the physically skewed transducer are minimal. Slider flying dynamics, such as pitch, roll and fly height are relatively unchanged as compared to a slider having a non-skewed transducer. It is therefore relatively easy and cheap for the manufacturer to implement embodiments of the present invention. Further, the present invention is equally applicable (with suitable modifications) for increasing storage capacity of disc drives having other medium form factor, transducer form factor and transducer type.

It is to be understood that other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

The invention claimed is:

1. A method comprising:
    ascertaining a plurality of capacity indicators for a plurality of zero skew positions on a medium;
    selecting a first of the plurality of capacity indicators;
    ascertaining a transducer orientation configured to provide a first zero skew position corresponding to the first capacity indicator; and
    providing a slider having a body with a trailing edge and a leading edge, the body having a transducer affixed thereto, the transducer comprising a writing element and a reading element, wherein the writing element and the reading element have a fixed angular displacement with respect to the trailing edge of the body of the slider.

2. The method of claim 1, wherein each of the plurality of capacity indicators is one of areal density, physical density, bit capacity and storage capacity of the medium.

3. The method of claim 1, wherein the first zero skew position is capable of providing a first storage capacity that is larger than storage capacities capable of being provided by remaining zero skew positions.

4. The method of claim 1, further comprising ascertaining a plurality of specifications of the disc drive for ascertaining the plurality of capacity indicators.

5. The method of claim 4, wherein at least one of the plurality of specifications is one of transducer dimensions, transducer shape, physical mechanics of transducer, transducer-to-disc spacing, slider arm dimensions, medium dimensions, inner recording radius of the medium, outer recording radius of the medium and recording density.

* * * * *